Nov. 3, 1931.       A. KAROLUS       1,830,231
MIRROR DISK FOR TELEVISION SYSTEMS
Filed Dec. 9, 1929
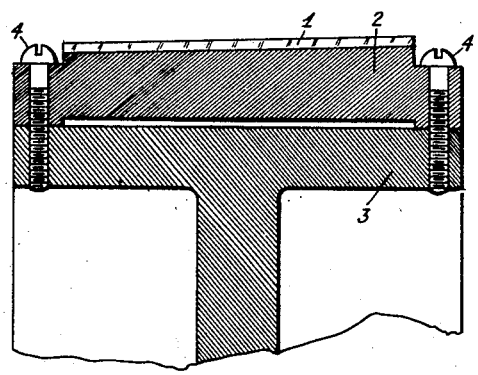
INVENTOR
AUGUST KAROLUS
BY
ATTORNEY Patented Nov. 3, 1931

1,830,231

UNITED STATES PATENT OFFICE

AUGUST KAROLUS, OF LEIPZIG, GERMANY, ASSIGNOR TO RADIO CORPORATION OF AMERICA, A CORPORATION OF DELAWARE

MIRROR DISK FOR TELEVISION SYSTEMS

Application filed December 9, 1929, Serial No. 412,587, and in Germany August 30, 1928.

It is well known that for the purpose of picture transmission in television and telecinematography, Weiller's mirror wheel may be used for the decomposition of the picture at the sending end as well as for picture recreation or reassembly at the receiving end. The Weiller mirror wheel consists of a number of identical mirrors which are so secured upon the periphery of a wheel that their median lines, like the sides of a polygon, meet under identical angles, while the inclination of the mirrors in relation to the axis of rotation of the wheel increases slightly from one mirror to the next. The spot of a light-ray pencil reflected from such a mirror wheel therefore describes in the plane of the picture or the plane to be scanned a surface made up of adjacent rows or lines of light, the height of which is governed by the angle occupied by the constituent mirrors and its distance from the scanning or picture plane, and whose width is governed by the size of the spot and the number of the mirrors.

In Weiller mirror wheels of the kind hereinbefore described it has been customary to adjustably secure the mirrors upon the circumference of the wheel with several adjustable screws in two planes in order to vary both the mutual inclination as well as the inclination relative to the axis of rotation. However, experience has shown that it is not possible in this manner to permanently insure proper adjustment. Owing to the centrifugal and compressive forces set up upon rotation of the wheel, the setting of the mirrors suffers alterations. The mirrors themselves further undergo flexures under the action of centrifugal force. These effects result in deviations of the spot upon the picture plane from its proper position and therefore in a distortion or deformation in shape. It has been found that it is not feasible in this manner to insure permanently sharp pictures.

In order to obviate the above difficulties, the present invention has for its object that of providing ways and means of securing true reproduction of pictures, films, or the like, as has been illustrated by the accompanying drawing.

The most essential feature of the invention is in the use of securing pieces 2 milled wedge-shaped and made of sufficient thickness, upon which the mirrors are fastened by cementing, so as to insure throughout a uniform and planar bearing. These wedge-shaped pieces 2 are screwed fast upon planar surfaces having parallel axes on the periphery of the mirror wheel 3, fine adjustment being effected, if necessary by thin washers, sheet-metal interpositions or the like. There are no difficulties in making planar surfaces upon the periphery of the wheel having parallel axes, while insuring a constant angle between all of these planes. While the construction of the wedges forms no part of my present invention, it may be done by means of a dividing plate or appropriate jig, or the like.

Inasmuch as the wedge-shaped pieces 2 when manufactured are given angles for the two surfaces so that there results a graduation of angles from one mirror to the next, the work of fine adjustment is accomplishable very easily. Proper adjustment is preserved since the securing screws 4 permanently insure the right position of setting, and since warping or bending is impossible because of the thickness of the securing pieces 2. By virtue of the uniform cementing of the mirror surfaces, also centrifugal force will be unlikely to lead to undesirable bending of the same, so that precision and accuracy of the light spot, both as regards shape and position are insured.

While I have for the purpose of illustrating my invention merely shown one embodiment thereof, it is, of course, obvious that the system is applicable to other similar uses and, therefore, I believe myself to be entitled to make any and all modifications such as fall fairly within the spirit and scope of the invention as set forth in the hereinafter appended claims.

Having now described my invention, what I claim and desire to secure by Letters Patent is the following:

1. In a scanning system, a rotary mirror supporting element, a series of wedge-shaped support members of graduated inclination rigidly secured upon said supporting element, and a reflecting scanning surface rigidly secured to each of said wedge-shaped members.

2. In a scanning system, a mirror supporting wheel, a series of wedge-shaped members of progressively graduated inclinations mounted about the periphery of said wheel, and a reflecting scanning surface cemented to each of said wedge-shaped members.

AUGUST KAROLUS.